United States Patent [19]
Pasternack

[11] 3,734,308
[45] May 22, 1973

[54] APPARATUS FOR SECURING AND LOCKING FREIGHT CONTAINERS IN STACKED RELATIONSHIP

[76] Inventor: Francis J. Pasternack, P.O. Box 752, 605 N. Wolf Road, Hillside, Ill. 60162

[22] Filed: Jan. 27, 1972

[21] Appl. No.: 221,347

[52] U.S. Cl. ........... 214/10.5 R, 105/366 C, 220/1.5, 248/119
[51] Int. Cl. ............................................... B65g 1/14
[58] Field of Search ................ 214/10.5 R, 14.15 R; 105/366 R, 366 A, 366 B, 366 C, 366 D, 366 E; 220/1.5, 97 R; 248/119

[56] References Cited

UNITED STATES PATENTS

| 3,081,120 | 3/1963 | Heinmiller et al. | 214/10.5 R X |
| 3,162,320 | 12/1964 | Hitch et al. | 220/1.5 X |
| 3,653,521 | 4/1972 | Bridge | 105/366 B X |

FOREIGN PATENTS OR APPLICATIONS

| 1,113,421 | 8/1961 | Germany | 214/10.5 R |

Primary Examiner—Gerald M. Forlenza
Assistant Examiner—Frank E. Werner
Attorney—George F. Dvorak et al.

[57] ABSTRACT

Apparatus for use with freight container for effecting the automatic securement and locking thereof in vertically stacked relationship, along with being used to secure such containers to the carrying surface of railroad flatcars, trailer chassis, ship decks and the like. The apparatus is in the form of a locking device including a pin vertically projecting from the top surface of a container and reciprocally movable between its projecting position and a position depressed inwardly of the container approximately flush with the top surface of the container, a pin receiving aperture in the bottom surface of the container in a position for receiving a pin from another container, a locking mechanism mounted inside the bottom surface of the container and adjacent the pin receiving aperture and movable between an operative position wherein it would engage a pin from another container when projecting therein, and an inoperative position where it would not engage any pin contained therein or would disengage from any pin previously retained therein; the pin and locking mechanism of a container being interconnected such that when the pin is in the position projecting above the container then the locking mechanism is in its operative position to engage and lock any other container pin inserted therein, and when the pin is in the depressed position then the locking mechanism is in an inoperative position so as not to engage any other pin inserted therein or to disengage and release any pin previously secured and locked therein.

10 Claims, 4 Drawing Figures

Patented May 22, 1973
3,734,308
2 Sheets-Sheet 1
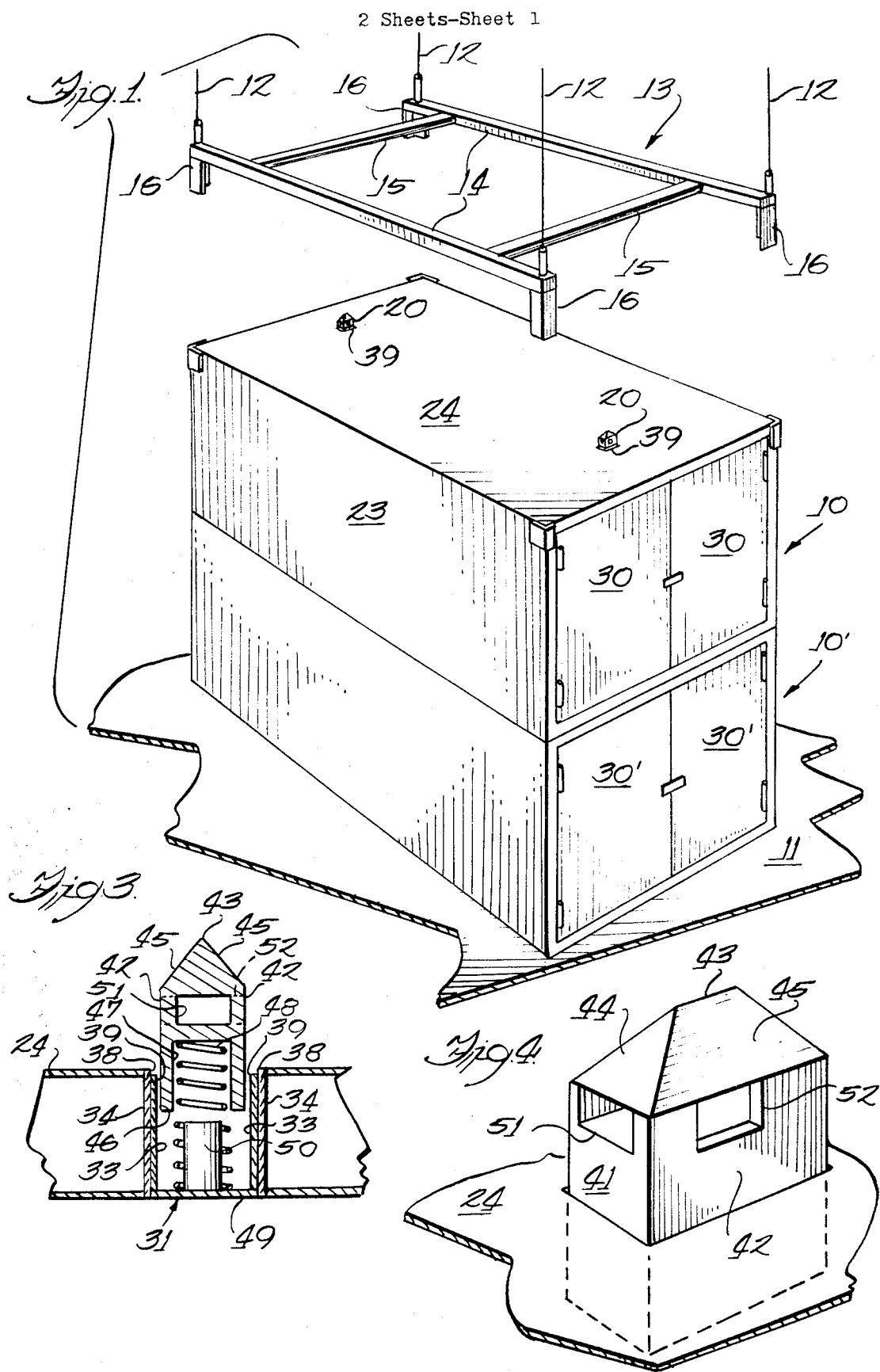

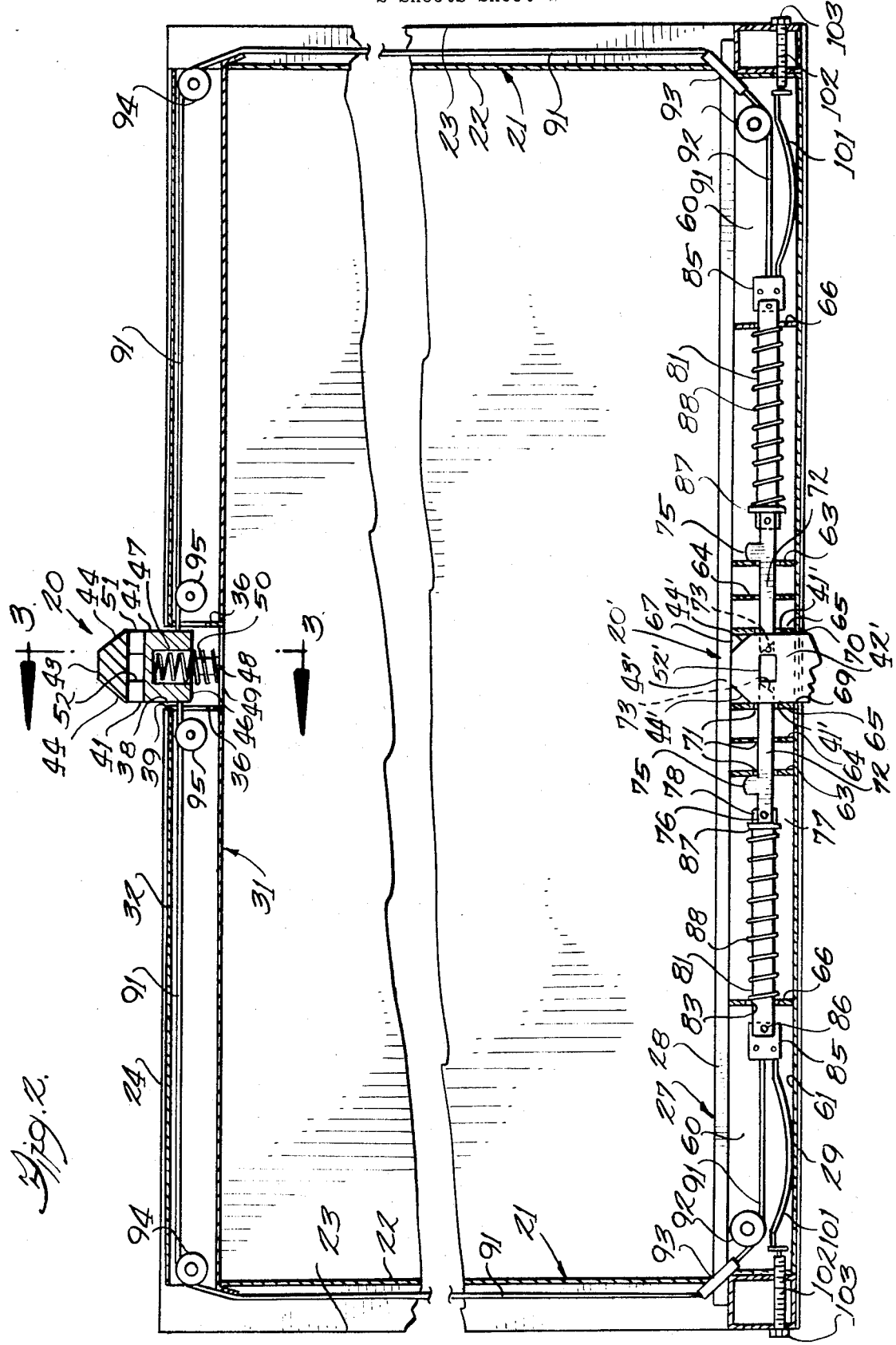

APPARATUS FOR SECURING AND LOCKING FREIGHT CONTAINERS IN STACKED RELATIONSHIP

BACKGROUND OF THE INVENTION

1. Field of the Invention

This invention relates generally to freight containers commonly in the form of trailer truck bodies, and more particularly to a device for automatically securing and locking such containers together in a vertically stacked manner with one container stacked on top of another container. Further, as such containers are normally used for containerized shipments of goods in which the container is loaded and initially sealed and remains sealed during the entire length of shipment, and as such containers are designed to be readily intertransferable between trailer truck bodies, railroad flatcars, ship decks, and the like, the devise of the present invention is also intended for automatically securing and locking such containers to each type of transporting carrier.

2. Description of the Prior Art

Freight containers of the present type are designed to be carried on a truck trailer chassis to the point of loading, such as a manufacturer's location, where the freight is placed in the container and the container then sealed. The container is then usually transported by the truck to a railroad loading yard where the container is lifted from the truck chassis and placed onto a waiting railroad flatcar. The container then travels by railroad to dockside where it is lifted from the railroad flatcar and placed either into the hold of a ship, or alternatively, it is placed on the deck of a ship. After being transported by the ship the container is then again lifted therefrom and placed on either a waiting railroad flatcar or truck chassis which is turn transports it to its final destination where the seal on the container is opened and the freight unloaded.

During each of the transferring movements of the freight container between transportation vehicles it is necessary to manually unlock and release the container from the transporting vehicle before the container can be removed therefrom, and then manually secure and lock the container to the new transporting vehicle on which it has been placed. Thus, in addition to the crane operator who operates the device for gripping and lifting the container, it is required that additional personnel be provided adjacent the railroad flatcar or truck trailer in order to manually unlock and release the container therefrom prior to its being lifted by the crane, with still further additional personnel being required on shipboard to receive the container and manually secure and lock the same in its selected position in the ship's hold or on the deck of the ship. In view of the high cost of this additional personnel, it would be advantageous to provide a means operable by the crane operator for securing and locking the containers onto the selected transporting vehicle with only the crane operator being required, thereby freeing the additional personnel now required so that they may perform other more useful work.

Locking devices presently available for use with containers require that the final securement and locking of a container to the transporting vehicle be accomplished by personnel positioned in the immediately adjacent area of the container to manually lock the same into its new position.

Further, presently available locking devices are exposed to the elements of the weather, necessitating continuous maintenance and replacement of parts due to the complete malfunction or the partial non-function of parts of the locking devices caused by the affects of severe rusting, sea-water corrosion, and the like. It would thus be advantageous to provide a locking device having its parts out of direct contact with the elements of the weather to prevent the severe rusting or corrosion of the same.

In addition, presently available locking devices are externally mounted on the container in positions selected for the ease of availability for manual manipulation of the locking device, such readily available positions being highly susceptible to damage during the transporting and transferring of the container. When damaged, the container is no longer avialable for usage while the required maintenance and repairs are made on the damaged locking device. This is quite costly when such damage occurs after the container has been loaded with freight and sealed as the damage must be immediately repaired if the transit time promised to the shipper for the container is to be maintained, it being understood that the container cannot be transported further without first fixing the locking device as without the same the container would not be properly secured to the transporting vehicle, this most likely resulting in the accidental release and falling of the container from its transporting vehicle and the resulting damage thereto and to the freight therein. Thus, immediate on-the-spot repairs must be made by the appropriate trained and unionized personnel with the associated high costs of time and labor involved. It would thus be advantageous to provide a locking device which would not be easily susceptible to shipping damages.

Presently available locking devices are normally specially designed with specially formed parts and the like, requiring that a stock of such parts be maintained for repair of the container locking mechanism when required. If one of the special parts is temporarily not in stock, then the container must be removed from usage until such part is again made available. It would thus be desirable to provide a locking device readily repairable with no special parts or tools being required.

A further disadvantage of presently available locking devices is that there is no compatibility in the field so that a container equipped with one type of locking device would not be able to use the same with a container fitted with a different type of locking device, so that when stacking such containers together or onto transporting vehicles equipped with different type of locking devices, it is necessary to use auxiliary chains and cables to secure the container in position. However, it would not be possible to readily stack some containers equipped with non-compatible locking devices as such locking devices actually interfere with the normal stacking relationship so that stacking could only be accomplished by the use of auxiliary spacing means placed between such containers prior to attempting to stack them. It would thus be advantageous to provide a securement and locking device which would be compatible with containers not having the same locking device such that the locking device would not interfere with the stacking of the containers.

SUMMARY OF THE INVENTION

The present invention remedies and overcomes all of the foregoing deficiencies and disadvantages of presently available securement and locking devices by providing a novel locking device for automatically securing and locking freight containers to each other in vertically stacked relationship, and also for automatically securing and locking freight containers to the carrying surface of a truck trailer chassis, railroad flatcar, deck of a ship, and the like in a positive manner securing the container from any shifting movement. No operating personnel or crews are required other than the lifting crane operator, as the locking device of the present invention provides for the crane lifting mechanism to automatically release the locking device and unlock the container immediately prior to the lifting of the container from its transporting vehicle, hold the locking device open during the transference procedure by the crane, and automatically lock the container in its new selected position on a new transporting vehicle upon the release and removal of the crane lifting mechanism from the container thereby automatically securing and locking the container in position against any shifting movement.

A further feature of the present invention is to provide a locking device having its parts out of contact with the weather thus preventing the severe rusting and corrosion of the same, assuring reliability of the locking device and minimizing any problems associated with malfunction during use.

A further feature of the present invention is to provide a locking device on a container which automatically moves into an inoperable position when another container not equipped with the locking device of the present invention is stacked thereon so as to permit the containers to be secured together by conventional chains and cables without the locking device of the present invention interfering therewith.

Still a further feature of the present invention is to provide a locking device disposed on a container in a position not readily susceptable to damage during the handling of the container.

Yet a further feature of the present invention is to provide a locking device readily repairable when necessary using regularly available personnel with no special parts or tools being required.

Yet a further feature of the present invention is its adaptability for removal from one container and installation for re-use in another container when the first container is no longer useable due to age, damage, bade condition, and the like.

The present invention by overcoming the deficiencies and disadvantages of prior art devices provides a solution to the problem of readily transferring sealed freight containers between transportation vehicles of different types, automatically releasing and securing the containers as required with only the normally required crane operator being necessary thus freeing other personnel and work crews for more useful work, providing complete compatibility between containers equipped with the device of the present invention and containers not so equipped thus allowing a fleet of containers to be individually equipped without having to remove the entire fleet of containers from usable service, and provides this solution in an economical manner requiring a minimum of time for installation of the invention on a container or vehicle with a minimum of maintenance being required during the estimated 20 year life of the container and the locking device thereon.

Other features and advantages of the present invention will be apparent during the course of the following description.

BRIEF DESCRIPTION OF THE DRAWINGS

In the accompanying drawings forming a part of this specification and in which like reference characters are employed to designate like parts throughout the same:

FIG. 1 is a perspective view illustrating two vertically stacked freight containers connected together and secured to a carrying surface or floor with the position of the crane lifting mechanism shown approaching a position to engage the top container and the pins projecting therefrom;

FIG. 2 is a cross-sectional view of one container taken along a vertical transverse plane and looking from one end of the container toward the other end of the container showing the details of the locking device as installed in the container;

FIG. 3 is an enlarged fragmentary view of the pin structure taken on Line 3—3 of FIG. 2; and FIG. 4 is a perspective view illustrating the pin.

DESCRIPTION OF THE PREFERRED EMBODIMENT

In the drawings, wherein for the purpose of illustration is shown a preferred embodiment of the present invention, and first particularly referred to FIG. 1, there is generally shown two containers 10 and 10' stacked in vertical relationship and secured to a carrier surface 11 of a railroad flatcar, trailer truck chassis, ship's hold, ship deck, and the like.

A crane lifting mechanism (not shown) has lifting cables 12 supporting lifting frame 13 in a horizontal plane for engagement with the top container 10. Lifting frame 13 includes longitudinally extending side members 14 and end members 15 transversely extending therebetween and disposed in longitudinally spaced relationship for engagement with each of pins 20 projecting from the top of container 10. The actual engagement and securement of the lifting frame 13 to the container 10 for lifting the same is accomplished in any of the known conventional manners, such as by corner guides 16 which engage and lock onto the container 10 for the lifting of the same.

It is to be understood that the lifting frame 13 and associated mechanism and structure is merely one of many different types which may be utilized in lifting and moving freight containers 10, the only requirement for the automatic operation of the present invention being the provision of a beam 15 or other member on the lifting frame 13 disposed in a manner such that when the lifting frame engages the container such beam or member simultaneously engages and depresses each of the pins 20.

As shown in FIG. 2 of the drawings, the containers 10 include hollow side walls 21 made up of an interior side wall surface 22 and an exterior side wall surface 23, a top wall 24, and a hollow bottom wall 27 made up of an interior bottom surface 28 and an exterior bottom surface 29. Doors 30 (FIG. 1) are disposed in one end of the container.

A transversely extending U-shaped channel member 31 is secured in an inverted manner in the top wall 24 of the container 10, the channel having a horizontal top portion 32 and opposed parallel vertically extending side leg portions 33, the top portion being disposed in juxtaposition with top surface 24 with the leg portions 33 being in juxtaposition with vertical disposed top surface supporting braces 34. Channel 31 is secured in position on the top wall 24 by any suitable means, such as by welding or bolting the top portion 32 and the leg portions 33 to the top surface 24 and the top surface supporting braces 34 respectively.

The pin 20 is supported for reciprocal vertical movement between leg portions 33 of the channel and vertically disposed guide plates 36 welded transversely of the channel 31 between side portions 33 and top portion 32. The pin 20 projects through an opening 38 in the top portion 32 of the channel 31, the opening being in general alignment with an opening 39 in the exterior top surface 24 of the container 10 to permit projection of the pin therethrough.

The pin has a rectangular body portion including side members 41 and end members 42, with the top of the pin terminating with an edge surface 43 extending longitudinally of channel 31 and connected to sides 41 by tapering surfaces 44 and to ends 42 by tapering surfaces 45. Surfaces 44 and 45 taper downwardly and outwardly from edge 43 to sides 41 and ends 42 respectively. The pin 20 has a bottom surface 46 with a circular aperture 47 extending vertically therein into the body portion of the pin for receiving one end of a compression spring 48, the opposite end of which is supported on a plate 49 suitably secured to the bottom of channel side portions 33 and extending thereacross. A spring guide rod 50 having one end secured to the plate 49 projects vertically upward therefrom in axial alignment with aperture 47 in the pin 20 for guiding the spring 48 and pin 20. An aperture 51 extends through the sides 41 of the pin 20, with a clean-out aperture 52 extending through the ends 42 of the pin intersecting the aperture 51 in approximately the center portion thereof.

Mounted in the bottom wall 27 and extending transversely of the container 10 is a U-shaped channel member 60 having a horizontally extending top portion 61 in juxtaposition with exterior bottom surface 29, and opposed vertically extending parallel side leg portions 62. The channel 60 is secured in the bottom wall 27 in any suitable manner, such as by welding or bolting. Pairs of opposed longitudinally spaced vertically extending guide plates 63, 64, 65, and 66 extend transversely between the side portions 62 of the channel 60 and are secured by welding to the side portions and the top portion 61 of the channel. The pair of guide plates 65 are longitudinally spaced apart a distance slightly greater than the width of the ends 42 of the pin 20 defining a pin retaining chamber 67 therebetween. A rectangular opening 69 slightly larger than the width of the ends 42 and sides 41 the pin 20 is formed in the channel top portion 61, the opening 69 being in general alignment with an opening 70 formed in the exterior bottom surface 29 of the container 10 so that a pin 20 identical to pin 20 but mounted on another container 10' or on a transporting vehicle (not shown) may enter through openings 69 and 70 into the pin retaining chamber 67 formed between the guide plates 65 in the channel 60.

It is to be understood that pin 20' is identical in size and shape to pin 20, and that henceforth reference characters designated by a prime sign indicate like parts between pin 20' and pin 20. The pin 20' may be the pin projecting from the top of another container 10', or may be a pin projecting from the carrying surface on the deck of a ship, railroad flatcar, trailer truck chassis and the like to which a container is to be secured and locked thereon.

Each of the pairs of guide plates 63, 64, and 65 have an aperture 71 extending therethrough, the apertures 71 being in axial alignment with each other. A pair of horizontally disposed axially aligned locking pins 72 extend longitudinally of the channel 60, one locking pin is associated with each set of guide plates 63, 64, 65 and movably supported by apertures 71 for sliding reciprocal movement therethrough. The locking pins 72 are movable in opposed directions with the free end 73 of each locking pin extending into the pin retaining chamber 67 formed between guide plates 65, the free ends being tapered at an angle to cooperate with the tapered side surfaces 44' of the pin 20'. A shoulder 75 is formed on the locking pins 72 near the ends 76 opposite the free ends 73 thereof for cooperating with the guide plates 63 to limit the amount of projection of the free ends of the locking pins into the pin receiving chamber 67.

The ends 76 of the locking pins 72 are each connected by a nut and bolt assembly 77 to one end 78 of a longitudinally extending spring guide member 81 associated with each locking pin. The opposite end 82 of each spring guide member 81 extending through an aperture 83 in one of the pair of guide plates 66 and terminating by being bolted to cable clamp 85 by nut and bolt assembly 86. A spring retainer washer 87 is positioned on each guide member 81 near end 78 abutting the end 76 of the connected locking pin 72, with a compression spring 88 supported on each spring guide member and interposed between the retainer washer 87 and the associated guide plate 66 in a manner to resiliently urge each of the locking pins longitudinally inwardly to maintain the free ends 73 projecting into the pin receiving chamber 67.

A pair of cables 91 are provided, one of the pair associated with each of the cable clamps 85 and each extending longitudinally outwardly from the cable clamps. As the reeving of both cables 91 is identical, only one will now be described. One end of the cable is secured to the cable clamp 85, after which the cable extends horizontally and is passed over a sheave 92 rotatably mounted in the channel 60. The cable then passes freely through a hollow guide tube 93 into the hollow side wall 21 between the interior side wall surface 22 and the exterior side wall surface 23 up to the top wall 24 where the cable is reeved over sheaves 94 and 95 rotatively supported in channel 31. The cable then passes through an aperture 96 in guide plate 36 with the end of the cable then connected to the nearest side 41 of the pin 20.

The cables 91 are each of such a length that the cables are taunt when pin 20 is in its maximum position projecting outwardly of channel 31 and above top surface 24 with the locking pins 72 maximumly projecting into the pin receiving chamber 67 to receive and retain a pin 20' therein. Upon depressing the pin 20 the cables 91 attached thereto pull the locking pins 72 in opposed outwardly directions removing the free ends 73 from the pin retaining chamber 67 permitting unrestricted entry and exit therefrom by a pin 20', or thus releasing any pin 20' previously locked therein.

The aperture 51' in the pin 20' is adapted to be engaged by the locking pins 72 for retention in the pin receiving chamber 67. The cleanout aperture 52' in pin 20' permits the removal of any foreign matter which may otherwise be retained in aperture 51' and cause the blocking of the same.

For emergency purposes, or should a lifting frame 13 not be readily available having cross beams or members thereon for engaging and depressing pins 20 when lifting the container 10, there is provided for each locking pin 72 a manual release assembly for retracting the free end 73 of each locking pin from the pin receiving chamber 67 for disengaging from and releasing any pin locking therein. The manual release assembly includes a cable 101 and a bolt 102 having a head portion 103 disposed outside the exterior side wall surface 23 for access externally of the container. One end of the cable 101 is secured to the cable clamp 85 with the cable 101 being strung loosely longitudinally through the channel 60 with the other end thereof being connected to the innermost end of the bolt 102.

In operation, pulling the bolt 102 outwardly of the channel 60 effects the tightening of the cable 101, with further outward movement of the bolt effecting the longitudinal outward movement of the associated locking pin 72 removing the free end 73 of the locking pin from the pin receiving chamber 67. By performing this operation with each of the locking pins 72 associated with a particular pin receiving chamber 67, any pin 20' previously retained and locked therein would be released as the locking pins 72 would have been removed from engagement with the aperture 51 of the pin thus permitting the removal of the pin from the pin receiving chamber.

It is also to be understood that the pins 20' may be secured to the carrying surfaces of railroad flatcars, trailer truck chassis, ship decks, and the like by screws, bolts, rivets, welding or the like, depending on the nature of the carrying surface and the purpose to be served. Alternatively, the pins 20' may be mounted in openings in the carrying surfaces and project therefrom under spring biasing similar to the mounting of the pin 20 in the channel 31 of the container 10 so that the pins may be easily run over and depressed flush with the carrying surface by the wheels of vehicles traveling over the carrying surface, such as fork trucks and the like, without any damage to the pins 20'. Such resilient type mounting also removing an otherwise dangerous hazard to the vehicles passing thereover on the carrying surface which would otherwise exist when the wheel of any such vehicle encounters a non-resilient structure in the carrying surface and the associated deflection of such wheel. The tapered surfaces 44' and 45' of the pin 20' assist in permitting ready depression of the pins by the wheels of any vehicles passing thereover.

OPERATION

In operation, beginning initially with a container 10 secured by pins 20' onto the carrying surface of a railroad flatcar or truck chassis, the container is transported to dockside for unloading and transference by a crane to be stacked in vertical relationship on top of a container 10' secured to the deck 11 of a ship. The crane operator initially brings the lifting frame 13 into engagement with the container 10 such that end frame members 15 engages and depress the pins 20 flush to the exterior top surface of the top wall 24 of the container.

When the pin 20 is depressed as a result of being engaged by the lifting frame 13, the pin pulls on the two cables 91 which in turn pull the two locking pins 72 out of engagement with aperture 51' in locking pin 20', and also remove the locking pins from projecting into the pin receiving chamber 67. This effects the disengagement of the locking pins 72 from the pin 20' such that container 10 now rests freely on the transporting vehicle carrying surface in an unlocked manner ready for removal from the carrying surface by the crane.

After the crane operator effects the securement of the lifting frame 13 to the container 10 in one of the suitable conventional automatic manners presently available, the crane then proceeds to lift the container from the carrying surface of the transporting vehicle as the container has been automatically unlocked and freed therefrom as set forth above in preparation for removal, and transfers the container to the waiting ship.

The crane then transfers the container 10 until it is aligned with and resting on the top surface of container 10'. The crane operator then releases and removes the lifting frame 13 from the container 10 and proceeds with the handling of a different container. Upon removal of the lifting frame from the container 10, the pins 20 acting under the urging of spring 48 return to their position projecting above the top wall 24 of the container, this releasing the tightness of cables 91 permitting the locking pins 72 to move inwardly of the container under urging of compression springs 88 so that the free ends 73 of the locking pins again project into the pin receiving chamber 67. Upon entering the pin receiving chamber 67 the pins 72 are engaged within aperture 51' of a pin 20' projecting from the top surface of container 10' into pin receiving chamber 67 of container 10. Thus, container 10 is automatically secured and locked against shifting movement to container 10' in a vertically stacked position.

A further container can be placed on the top of container 10 and engage pin 20 in the same manner so that it is readily seen that a vertically stacked pile of containers can be obtained with each container automatically securing and locking itself to the container therebeneath upon being released by the crane operator.

When removing the containers from their stacked relationship, the same procedure is followed with the lifting frame 13 engaging the top most container 10 simultaneously depressing the pins 20 which in turn remove the locking pins 72 from engagement with the pins 20' of the container 10' located therebeneath, this permitting the top most container to be removed by the crane and transferred to a different location or a different transporting vehicle. Upon its placement on a different transporting vehicle having pins 20', the container 10 will automatically be secured and locked thereon upon removal of the lifting frame 13 by the crane operator permitting the locking pins 72 to engage aperture 51' in pins 20' secured to the transporting vehicle carrying surface thus automatically securing and locking the carrier thereon against any shifting movements.

It is understood that the form of this invention herewith shown and described is to be taken as a preferred example of the same, and that various changes in shape, size, and arrangement of parts may be resorted to without departing from the spirit of the invention, the scope of the novel concepts thereof, or the scope of the subjoined claims.

I claim:

1. Apparatus intended for use with freight containers for effecting the automatic securement and locking of freight containers in vertically stacked relationship with one container secured on top of another, each container having top, bottom, end, and side surfaces, the combination comprising:

a pin supported on the top surface of a container and movable between a position projecting outwardly from said top surface and a position depressed inwardly of said container approximately flush with said top surface thereof;

a pin receiving aperture in the bottom surface of the container;

locking means mounted on the container bottom surface adjacent said pin receiving aperture and movable between an operative position and an inoperative position, the operative position permitting the locking engagement of the locking means with a pin mounted on the top surface of another container and projecting into said pin receiving aperture to secure the mounted pin therein, and the inoperative position disengaging said locking means from said mounted pin to release the container therefrom; and operating means interconnecting said pin and said locking means so that when said pin is in said projecting position then said locking means is operative to engage and lock said other container pin therein, and when said pin is in the depressed position then said locking means is in said inoperative position thereby disengaging and releasing said container from said other container pin;

whereby said container is secured to the top surface of said other container with the bottom surface of said container being in juxtaposition with the top surface of said other container.

2. Apparatus as set forth in claim 1 wherein:

said pin is reciprocally vertically movable relative to said top surface, and resilient means maintaining said pin in the normally projecting position until engaged and depressed by external forces.

3. Apparatus as set forth in claim 1 wherein said operating means comprises a flexible cable interconnecting said pin and said locking means.

4. Apparatus as set forth in claim 1 wherein said locking means comprising:

a locking member movably supported in a sliding manner along the bottom surface of the container;

one end of said locking member being connected to said operating means;

the other end of said locking member being directed toward said pin receiving aperture and movable between an inoperative position substantially adjacent said aperture and an operative position extending into said aperture to engage and secure said container to a pin from another container projecting into said pin receiving aperture;

resilient means normally biasing said locking member toward said position extending into said pin receiving aperture.

5. Apparatus as set forth in claim 4 further characterized by:

said pin having an aperture therein for positive engagement therewith with said other end of said locking member.

6. Apparatus as set forth in claim 4 further characterized by:

said pin having a rectangular cross-section, the top of said pin tapering upwardly and inwardly from the outer pin surface towards the center of the pin, an aperture extending transversely through said pin in the upper portion of the pin normally projecting above the top surface of the container, said aperture adapted to engage with the locking member mounted on another container;

said other end of said locking member being tapered to engage and cooperate in a camming manner with the tapered top surface of a pin inserted into said pin receiving aperture so as to cam the locking member slideably outwardly from the pin receiving aperture as the pin enters therein until the pin has sufficiently entered so the aperture in the pin is in position for the locking member to engage into said aperture under urging of said locking member resilient means thereby securing and locking the pin in the pin receiving aperture.

7. Apparatus as set forth in claim 1 wherein said locking means comprises:

a pair of elongated axially aligned locking members each having one end secured by said operating means to said pin, the locking members adapted for simultaneous movement in opposite directions along the bottom container surface.

the free ends of said locking members each projecting into said pin receiving aperture in their operating position, and each being slidably removed from said pin receiving aperture in their inoperative position; and a spring operatively associated with each locking member for urging each toward said operating position.

8. Apparatus as set forth in claim 1 further comprising:

manually operable release means connected to said locking means, a portion of the release means extending outwardly of said container for operation externally of said container, said release means operable to move said locking means to the inoperable position regardless of the position of said pin thereby effecting the disengagement and release of said locking means from said other container pin.

9. Apparatus as set forth in claim 8 wherein said manual release means comprises:

a bolt freely extending through the lower portion of said container side surface, the head portion of the bolt disposed externally of the container with the body portion of the bolt extending inwardly of the container in the direction of said locking means, a cable loosely interconnecting said bolt to said locking means;

whereby withdrawal of the bolt from said container effects the movement of said locking means to the inoperative position irrespective of the position of said pin and said operating means.

10. Apparatus for use with freight containers for effecting the automatic alignment and securement thereof to the carrying surface of a transporting vehicle such as a truck chassis, ship deck, railroad flatcar, and the like, each container having top, bottom, end, and side surfaces, the combination comprising:
- a pin movably supported on the top surface of a container and movable between a position projecting outwardly from said top surface and a position depressed inwardly of said container approximately flush with said top surface thereof;
- a pin receiving aperture in the bottom surface of the container;
- a pin secured on said carrying surface of said transporting device and projecting upwardly therefrom.
- locking means mounted on the container bottom surface adjacent said pin receiving aperture and movable between an operative position and an inoperative position, the operative position permitting the locking engagement of the locking means with said pin projecting from said carrying surface and received in said pin receiving aperture to secure and lock said carrying surface pin therein, and the inoperative position disengaging said locking means from said carrying surface pin to release the container therefrom; and
- operating means interconnecting said pin and said locking means so that when said pin is in said projecting position then said locking means is operative to engage and lock said carrying surface pin therein, and when said pin is in the depressed position then said locking means is in said inoperative position thereby disengaging and releasing said container from said carrying surface pin;
- whereby said container is secured and locked to said carrying surface of said transporting vehicle with the bottom surface of said container being in juxtaposition with the carrying surface of said transporting vehicle.

* * * * *